United States Patent [19]
Goodwin, III et al.

[11] Patent Number: 6,098,049
[45] Date of Patent: *Aug. 1, 2000

[54] ELECTRONIC PRICE LABEL SYSTEM INCLUDING GROUPS OF ELECTRONIC PRICE LABELS AND METHOD OF MANAGING THE GROUPS

[75] Inventors: John C. Goodwin, III, Suwanee; Robert M. Berman, Lawrenceville, both of Ga.

[73] Assignee: NCR Corporation, Dayton, Ohio

[*] Notice: This patent is subject to a terminal disclaimer.

[21] Appl. No.: 08/960,666

[22] Filed: Oct. 30, 1997

[51] Int. Cl.$^7$ ...................................................... G06F 17/60
[52] U.S. Cl. ................................. 705/21; 705/16; 705/20
[58] Field of Search .................................. 705/21, 20, 16, 705/26, 27, 416; 235/383; 340/825.3, 825.35; 345/30

[56] References Cited

U.S. PATENT DOCUMENTS

| | | | |
|---|---|---|---|
| 4,002,886 | 1/1977 | Sundelin | 235/61.7 R |
| 4,500,880 | 2/1985 | Gomersall et al. | 340/825.35 |
| 4,924,363 | 5/1990 | Kornelson | 362/125 |
| 5,153,585 | 10/1992 | Negishi et al. | 340/870.28 |
| 5,172,314 | 12/1992 | Poland et al. | 364/401 |
| 5,299,117 | 3/1994 | Farnbach | 364/405 |
| 5,348,485 | 9/1994 | Briechle et al. | 439/110 |
| 5,448,226 | 9/1995 | Failing, Jr. et al. | 340/825.35 |
| 5,461,561 | 10/1995 | Ackerman et al. | 364/401 |
| 5,632,010 | 5/1997 | Briechle et al. | 345/1 |
| 5,847,378 | 12/1998 | Goodwin, III | 235/383 |
| 5,854,474 | 12/1998 | Goodwin, III | 235/383 |
| 5,854,476 | 12/1998 | Goodwin, III | 235/383 |
| 5,864,325 | 1/1999 | Briechle et al. | 345/1 |
| 5,977,998 | 11/1999 | Briechle et al. | 345/520 |
| 5,987,427 | 11/1999 | Goodwin, III et al. | 705/21 |

*Primary Examiner*—Eric W. Stamber
*Assistant Examiner*—Susanna Meinecke-Díaz
*Attorney, Agent, or Firm*—Paul W. Martin; Peter H. Priest

[57] ABSTRACT

An electronic price label (EPL) system including groups of electronic price labels and method of managing the groups which facilitate group definition, assignment of EPLs to groups, assignment of items to EPLs, and assignment of prices to items. The system includes a plurality of EPLs arranged in a single line of bays within a sign to define a group. A computer coupled to the EPLs defines the group, assigns the EPLs to the group, and assigns item identification numbers and prices to the EPLs. A storage medium stores group definition information, EPL assignments to the group, and item assignments to the EPLs. The storage medium additionally stores a price identifier, which is preferably added to the item identification numbers to form modified item identification numbers.

17 Claims, 9 Drawing Sheets

FIG. 2

PLU DATA FILE

| ITEM ID | PRICE 1 | PRICE 2 | PRICE 3 |
|---------|---------|---------|---------|
| ----    | ----    | ----    | ----    |
| ----    | ----    | ----    | ----    |
| ----    | ----    | ----    | ----    |
| ----    | ----    | ----    | ----    |
| ----    | ----    | ----    | ----    |
| ----    | ----    | ----    | ----    |

FIG. 3

EPL DATA FILE

| EPL ID | ITEM ID | EPL CHECK |
|--------|---------|-----------|
| ----   | ----    | ----      |
| ----   | ----    | ----      |
| ----   | ----    | ----      |
| ----   | ----    | ----      |
| ----   | ----    | ----      |
| ----   | ----    | ----      |

FIG. 4

GROUP DEFINITION FILE

| GROUP # | LINES |
|---------|-------|
| - - - - | - - - - |
| - - - - | - - - - |
| - - - - | - - - - |
| - - - - | - - - - |
| - - - - | - - - - |
| - - - - | - - - - |

FIG. 5

EPL ASSIGNMENT FILE

| GROUP # | LINE # | EPL ID |
|---------|--------|--------|
| - - - - | - - - - | - - - - |
| - - - - | - - - - | - - - - |
| - - - - | - - - - | - - - - |
| - - - - | - - - - | - - - - |
| - - - - | - - - - | - - - - |
| - - - - | - - - - | - - - - |

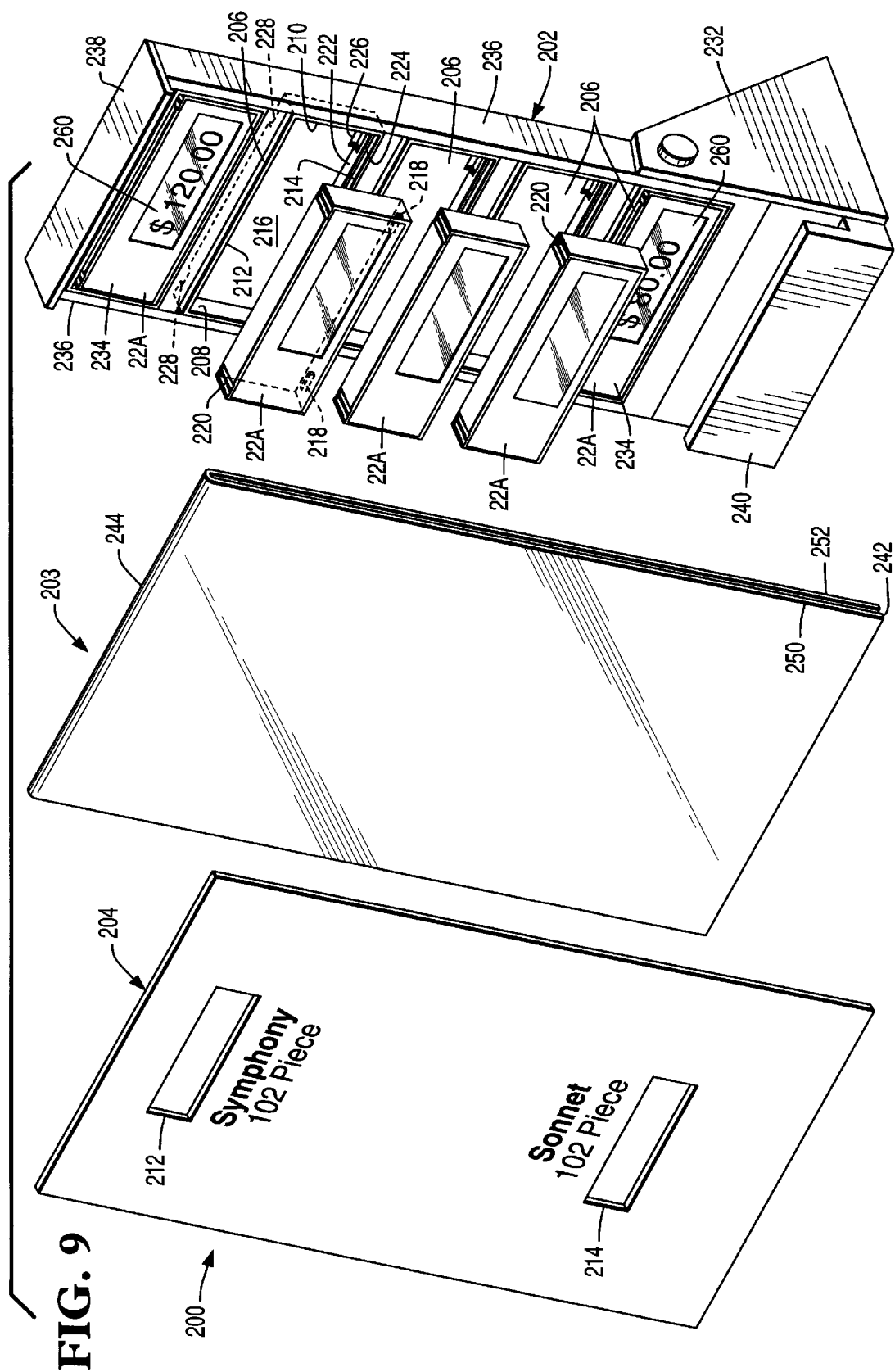

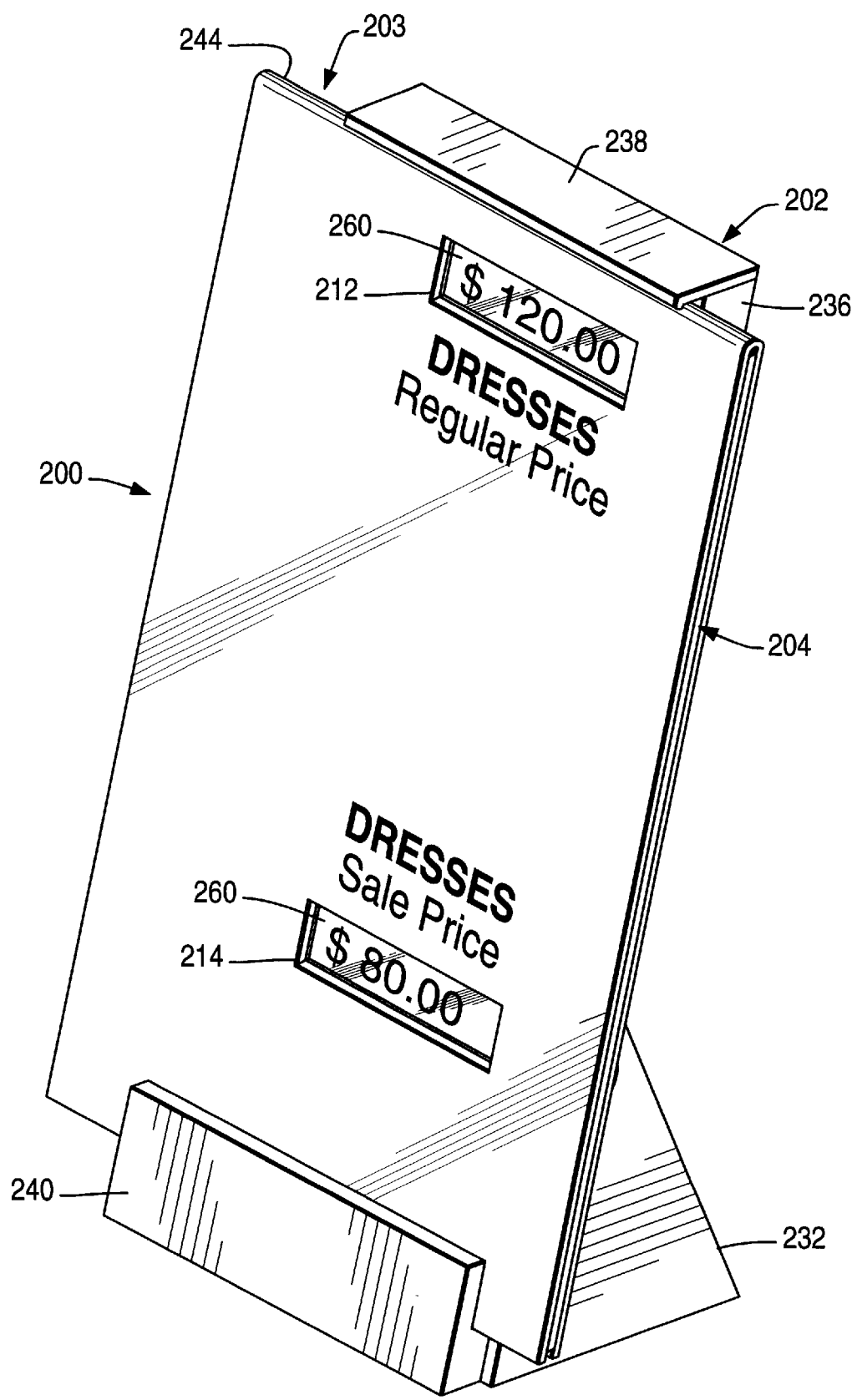

ELECTRONIC PRICE LABEL SYSTEM INCLUDING GROUPS OF ELECTRONIC PRICE LABELS AND METHOD OF MANAGING THE GROUPS

The present invention is related to the following commonly assigned and co-pending U.S. applications:

Ser. No. 08/960,665, entitled, "Electronic Price Label System Including Groups Of Electronic Price Labels And Method Of Managing The Groups", filed Oct. 30, 1997, and invented by Goodwin et al.;

Ser. No. 08/960,801, entitled, "Apparatus For Grouping Electronic Price Labels", filed Oct. 30, 1997, and invented by Forsythe et al.; and Ser. No. 08/961,514, entitled, "Apparatus For Grouping Electronic Price Labels", filed Oct. 30, 1997, and invented by Forsythe et al.

BACKGROUND OF THE INVENTION

The present invention relates to electronic price label (EPL) systems used in transaction establishments, and more specifically to an electronic price label system including groups of electronic price labels and a method of managing the groups.

EPL systems typically include a plurality of EPLs for each merchandise item in a store. EPLs typically display the price of corresponding merchandise items on store shelves and are typically attached to a rail along the leading edge of the shelves. A store may contain thousands of EPLs to display the prices of the merchandise items. The EPLs are coupled to a central server from where information about the EPLs is typically maintained in an EPL data file. Price information displayed by the EPLs is obtained from the PLU file.

EPLs today may be wired or wireless. Wireless EPLs may employ infrared or radio frequency transmitters to transmit acknowledgment signals acknowledging receipt of messages and to relay acknowledgment signals from other EPLs to receiving devices coupled to a main EPL computer.

Current shelf mounting arrangements for EPLs work well in a typical store environment. However, they are not well-suited for displaying price information on a family of products or a plurality of styles associated with a single product. They are also not well-suited for promoting items located on end-aisle and other promotional structures besides standard shelving. Mass merchants, including department store retailers desire more flexibility in mounting EPLs to better promote their products.

Therefore, it would be desirable to group EPLs in containers, such as cassettes. It would also be desirable to provide a method of managing the groups.

SUMMARY OF THE INVENTION

In accordance with the teachings of the present invention, an electronic price label system including groups of electronic price labels and a method of managing the groups is provided.

An electronic price label system including groups of electronic price labels and method of managing the groups which facilitate group definition, assignment of EPLs to groups, assignment of items to EPLs, and assignment of prices to items. The system includes a plurality of EPLs arranged in a single line of bays within a sign to define a group. A computer coupled to the EPLs defines the group, assigns the EPLs to the group, and assigns item identification numbers and prices to the EPLs. A storage medium stores group definition information, EPL assignments to the group, and item assignments to the EPLs. The storage medium additionally stores a price identifier, which is preferably added to the item identification numbers to form modified item identification numbers.

It is a feature of the present invention that a plurality of prices can be displayed for a plurality of related items. Thus, the groups are particularly suited for use in promotional signs.

It is also a feature of the present invention that group definition, assignment of EPLs to groups, assignment of items to groups, and assignment of prices to items may be easily accomplished.

It is accordingly an object of the present invention to provide an electronic price label system including groups of electronic price labels and method of managing the groups.

It is another object of the present invention to provide an apparatus for facilitating use of EPLs in promoting items that are not located on standard merchandise shelves.

It is another object of the present invention to provide a system and method of managing a single column or row of EPLs which display different prices for different items.

It is another object of the present invention to provide a system and method of managing a single column or row of EPLs which display different prices for different styles of the same item.

It is another object of the present invention to provide a system and method of managing a single column or row of EPLs which display regular and special prices for an item.

It is another object of the present invention to provide an apparatus for grouping electronic price labels (EPLs).

It is another object of the present invention to provide an apparatus for grouping EPLs into a single column or row.

It is another object of the present invention to provide a sign or other promotional apparatus containing groups of EPLs arranged in a single column or row.

It is another object of the present invention to provide a sign or other promotional apparatus containing groups of EPLs for displaying different prices associated with related items.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a diagram of a PLU data file;

FIG. 3 is a diagram of an EPL data file;

FIG. 4 is a diagram of an EPL group definition file;

FIG. 5 is a diagram of an EPL assignment file;

FIG. 9 is an exploded view of a first sign incorporating a cassette; and

FIG. 10 is a second sign incorporating a cassette.

DETAILED DESCRIPTION OF THE PREFERRED EMBODIMENT

Figure 1:
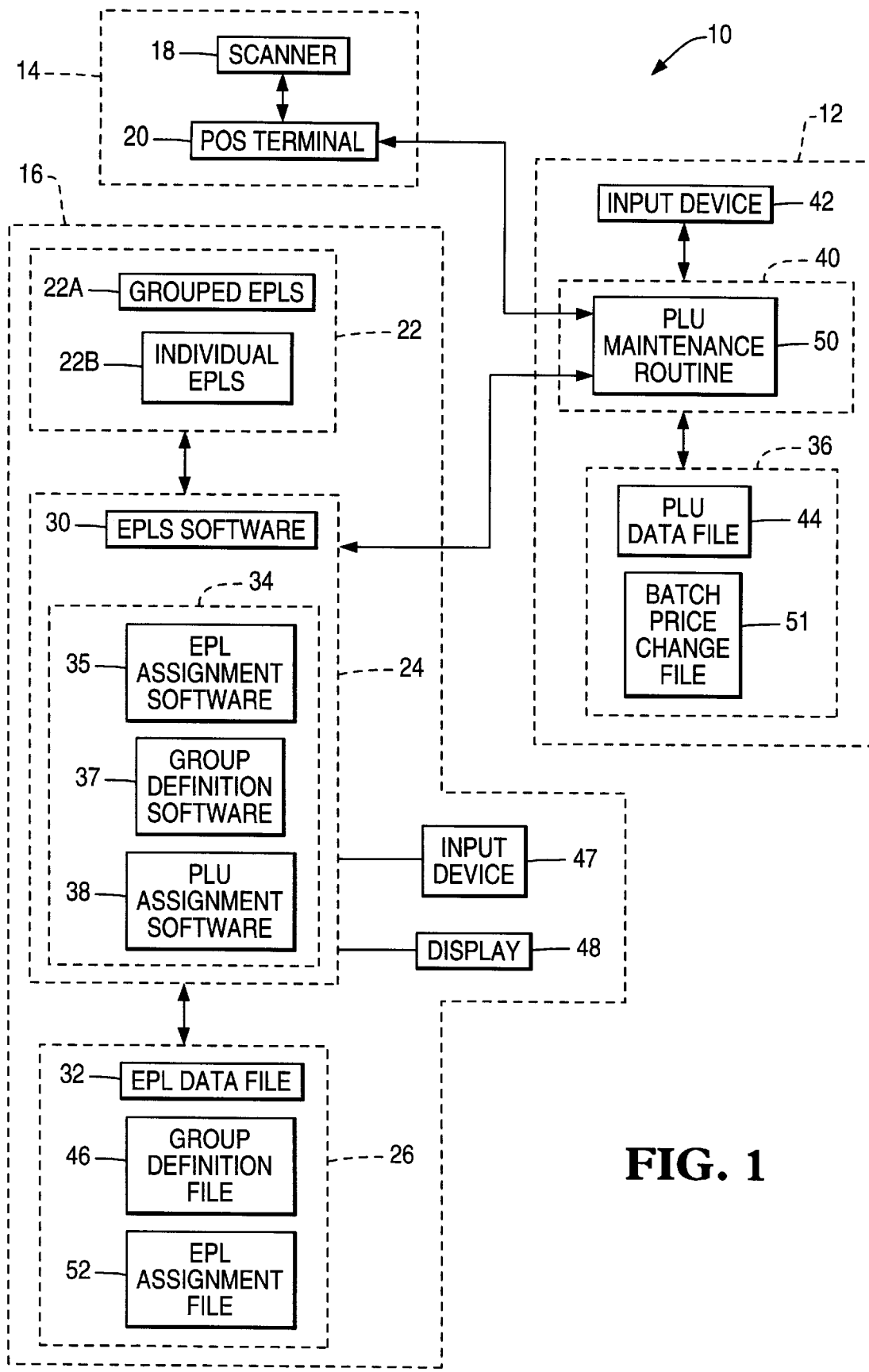
FIG. 1 is a block diagram of a transaction management system, including an EPL system.

Referring now to FIG. 1, a transaction management system 10 primarily includes host computer system 12, point-of-service (POS) system 14, and EPL system 16.

Host computer system 12 includes storage medium 36, host PLU terminal 40, and input device 42.

Storage medium 36 stores PLU data file 44. PLU data file 44 stores item prices and is available for distribution to POS terminal 20 by host PLU terminal 40. Alternatively, provision may be made for bar code scanner 18 to directly access primary PLU file 44 from host PLU terminal 40.

Here, terminals 20, 24, and 40 are shown as separate components that are networked together, but they may also be combined in different ways. For example, EPL terminal 24 and host PLU terminal 40 may be combined to form a single host computer. POS terminal 20 and host PLU terminal 40 may be combined to form a POS terminal which doubles as a host computer for a network of other POS terminals.

Host PLU terminal 40 executes PLU maintenance routine 50. PLU maintenance routine 50 updates PLU data file 44.

Input device 42 is preferably a keyboard.

PLU maintenance routine 50 may send changes in price in PLU file 44 directly to EPL terminal 24 and POS terminal 20 as they are entered in input device 42 (immediate processing) or store price changes within a batch file 51 in storage medium 36 for later batch updating (batch processing).

PLU data file 44 (FIG. 2) includes a line entry for each item sold in the store. Each line entry has an item identification entry (ITEM ID), and PLU price entries (PRICE 1, PRICE 2, etc.). Entry ITEM ID identifies a store item. Entry PRICE 1 typically identifies the regular price read by POS system 14 to determine the price of an item during scanning by bar code scanner 18. When present, the additional prices (PRICE 2, PRICE 3, etc.) may include special or "sale" prices or additional version/style prices associated with an item.

POS system 14 includes bar code scanner 18 and terminal 20.

EPL system 16 primarily includes EPLs 22, host EPL terminal 24, and EPL storage medium 26.

EPLs 22 include EPLs 22A and EPLs 22B. EPLs 22B are typically attached to shelves within a store. Grouped EPLs 22A are assigned to a product having different versions or styles. Thus, each EPL 22A displays prices of different versions or special prices associated with a single product's ITEM ID. EPLs 22A may be arranged in a cassette 200 (FIG. 9) or other suitable holder.

Host EPL terminal 24 executes EPL software 30 and group management software 34. Host EPL terminal 24 obtains price information from PLU data file 44 and sends it to EPLs 22. EPL software 30 schedules price change messages for transmission to EPLs 22 and manages communication between host EPL terminal 24 and EPLs 22.

EPL software additionally maintains EPL data file 32 (FIG. 3). EPL data file 32 includes a line entry for each EPL 22 in EPL system 16. Each line entry has an item identification entry (ITEM ID), an EPL identification entry (EPL ID), and may additionally include an EPL price checksum value entry (EPL CHECK).

In accordance with the present invention, a flag normally used to indicate to an EPL whether to display a unit price is modified to indicate to an EPL whether to display any of the prices in PLU data file 44 and whether to display the price in the left half of the EPL's display or in the right half of the EPL's display. Alternatively, additional entries for price and location may be added to EPL data file 32 and selected using EPL assignment software 35 and PLU assignment software 38.

Entry ITEM ID identifies a store item. Entry EPL ID identifies which EPL is assigned to the item. Entry EPL CHECK is a checksum value of the digits of the price information that is displayed by EPL 22.

Group management software 34 manages assignment of EPLs 22A to groups and item identification numbers to EPLs 22A. For this purpose, group management software 34 includes EPL assignment software 35, group definition software 37, and PLU assignment software 38.

Group definition software 37 stores group definition information in group definition file 46 (FIG. 4). Group definition file 46 includes line entries for group numbers (GROUP#) and a total number of EPLs 22A within the groups (LINES).

EPL assignment software 35 stores EPL assignment information in EPL assignment file 52 (FIG. 5). EPL assignment file 52 includes line entries for group numbers (GROUP#), relative positions of EPLs 22A within the group (LINE#), and EPL identification numbers (EPL ID).

PLU assignment software 38 assigns item identification numbers to EPLs 22A within groups. Item assignments are stored within EPL data file 32, along with item assignments of EPLs 22B.

EPL storage medium 26 stores EPL data file 32, group definition file 46, and EPL assignment file 52, and is preferably a fixed disk drive.

EPL system 16 additionally includes input device 47 and display 48. Input device 47 records information to be stored within EPL data file 32, group definition file 46, and EPL assignment file 52. Input device 47 is preferably a keyboard.

Display 48 displays program and recorded information during execution of EPL assignment software 35, group definition software 37, and PLU assignment software 38.

Figure 6:
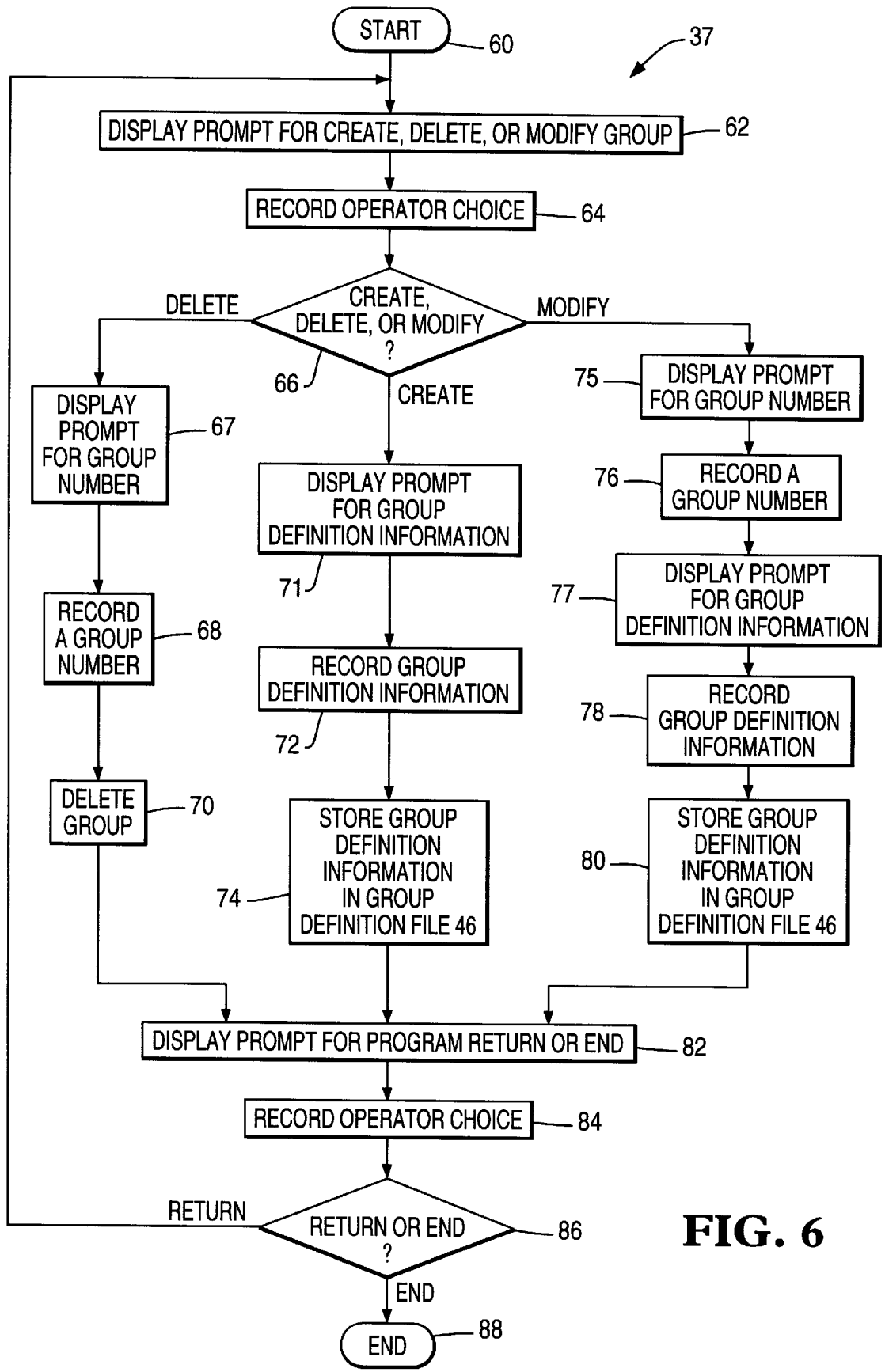
FIG. 6 is a flow diagram illustrating operation of group definition software.
Figure 7:
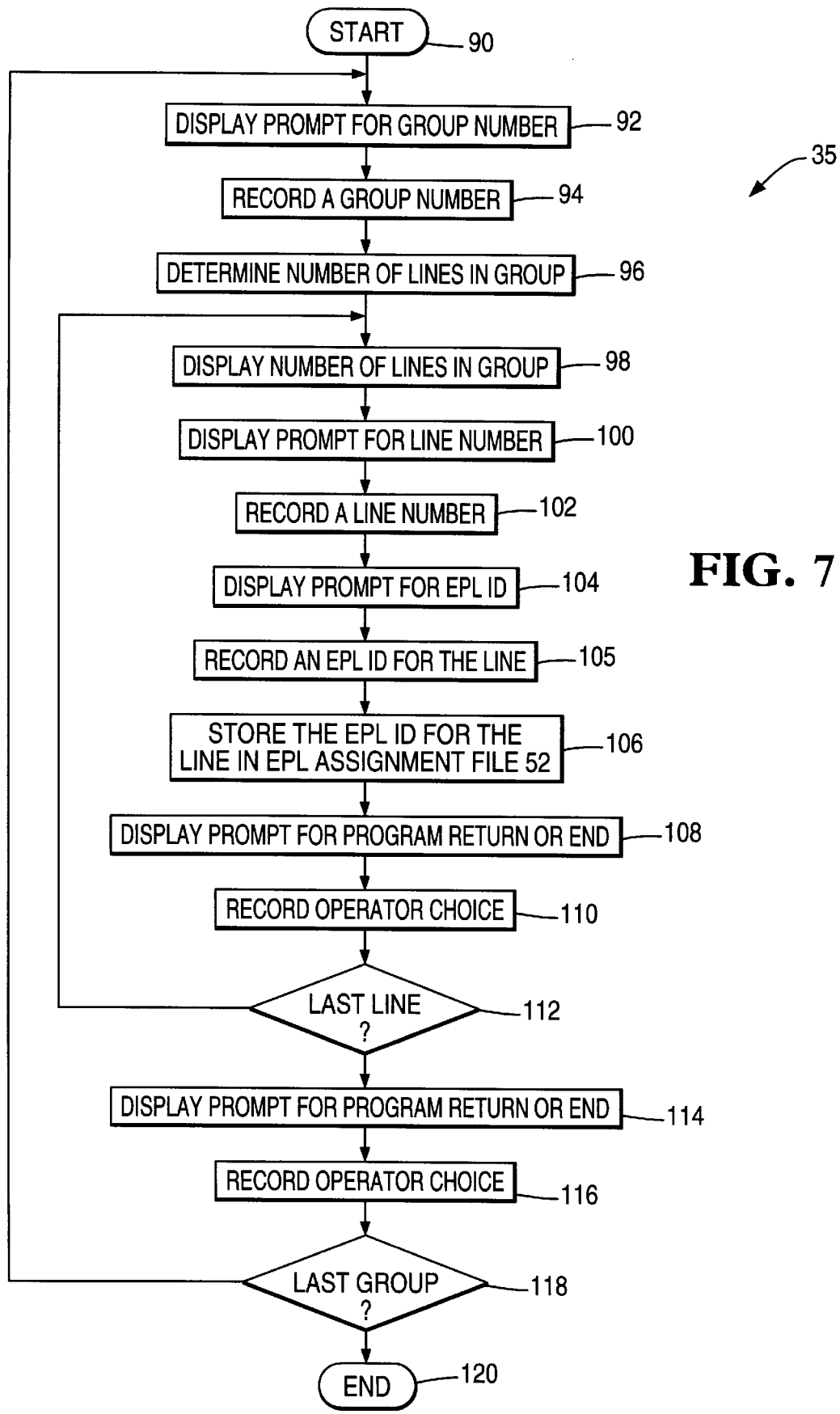
FIG. 7 is a flow diagram illustrating operation of EPL assignment software.

Turning now to FIGS. 6–8, the operation of group management software 34 is illustrated in more detail.

With reference to FIG. 6, operation of group definition software 37 begins with START 60.

In step 62, group definition software 37 displays a prompt for an operator to select to create, delete, or modify a group using display 48.

In step 64, group definition software 37 records the operator choice entered using input device 47.

In step 66, group definition software 37 determines from the recorded choice whether a group is to created, deleted, or modified.

For deletion, operation proceeds to step 67.

In step 67, group definition software 37 displays a prompt for a group number using display 48.

In step 68, group definition software 37 records a group number (GROUP#) entered by the operator using input device 47.

In step 70. group definition software 37 deletes group definition information for the selected group from group definition file 46.

Operation proceeds to step 82.

Returning now to step 66, for creation, operation proceeds to step 71.

In step 71, group definition software 37 displays a prompt for the operator to enter group definition information.

In step 72, group definition software 37 records a group number (GROUP#) and number of lines to be in the group entered by the operator.

In step 74, group definition software 37 stores the group definition information in group definition file 46.

Operation proceeds to step 82.

Returning now to step 66, for modification, operation proceeds to step 75.

In step 75, group definition software 37 displays a prompt for a group number (GROUP#).

In step 76, group definition software 37 records a group number entered by the operator.

In step 77, group definition software 37 displays a prompt for group definition information.

In step 78, group definition software 37 records group definition information, including number of lines in the group (LINES) entered by an operator.

In step 80, group definition software 37 stores the group definition information in group definition file 46.

Operation proceeds to step 82.

In step 82, group definition software 37 displays a prompt for program return to create, delete, or modify another group, or for program end.

In step 84, group definition software 37 records the operator choice entered using input device 47.

In step 86, group definition software 37 determines from the recorded choice whether to create, delete, or modify another group or end.

For return, operation returns to step 62.

For end, operation ends in step 88.

With reference to FIG. 7, operation of EPL assignment software 35 begins with START 90.

In step 92, EPL assignment software 35 displays a prompt for a group number (GROUP#) using display 48.

In step 94, EPL assignment software 35 records a group number entered by an operator using input device 47.

In step 96, EPL assignment software 35 determines the number of lines (LINES) in the selected group from group definition file 46.

In step 98, EPL assignment software 35 displays the determined number of lines in the selected group.

In step 100, EPL assignment software 35 displays a prompt for a line number (LINE#) within the selected group.

In step 102, EPL assignment software 35 records a line number entered by the operator.

In step 104, EPL assignment software 35 displays a prompt for an EPL identification number (EPL ID) to be assigned to the selected line number.

In step 105, EPL assignment software 35 records an EPL identification number entered by the operator.

In step 106, EPL assignment software 35 stores the EPL identification number for the line in EPL assignment file 52.

In step 108, EPL assignment software 35 displays a prompt for program return to assign another EPL to another line, or for operation to continue.

In step 110, EPL assignment software 35 records the operator choice entered using input device 47.

In step 112, EPL assignment software 35 determines from the recorded choice whether to return or continue.

For return, operation returns to step 98 to assign an additional EPL identification number to another line in the selected group.

Otherwise, operation continues in step 114.

In step 114, EPL assignment software 35 displays a prompt for program return to select another group, or for program end.

In step 116, EPL assignment software 35 records the operator choice entered using input device 47.

In step 118, EPL assignment software 35 determines from the recorded choice whether to return to select another group, or to end.

For return, operation returns to step 92 to select another group.

Otherwise, operation ends at END 120.

Figure 8A:
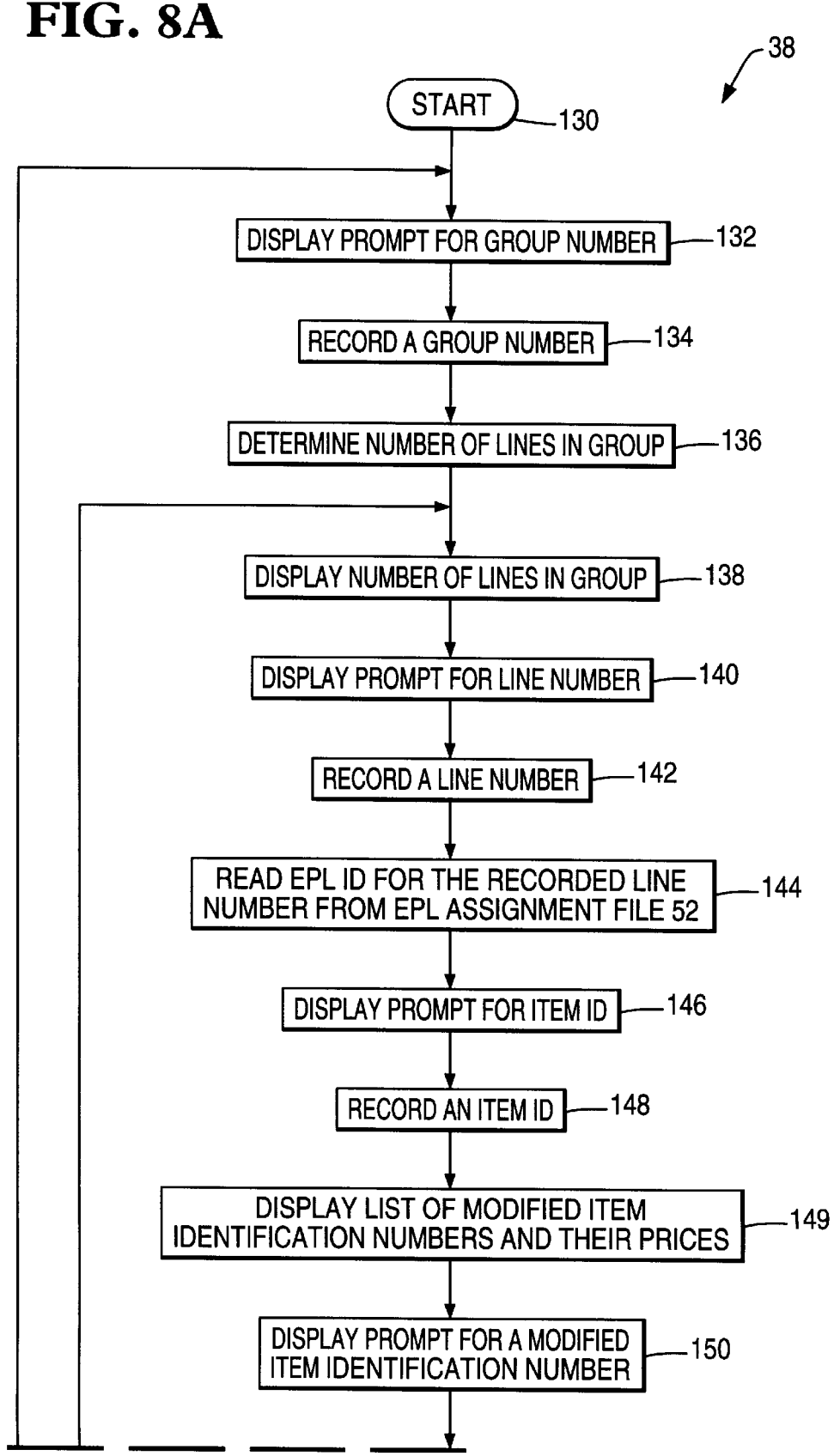
FIGS. 8A and 8B form a flow diagram illustrating operation of PLU assignment software.
Figure 8B:
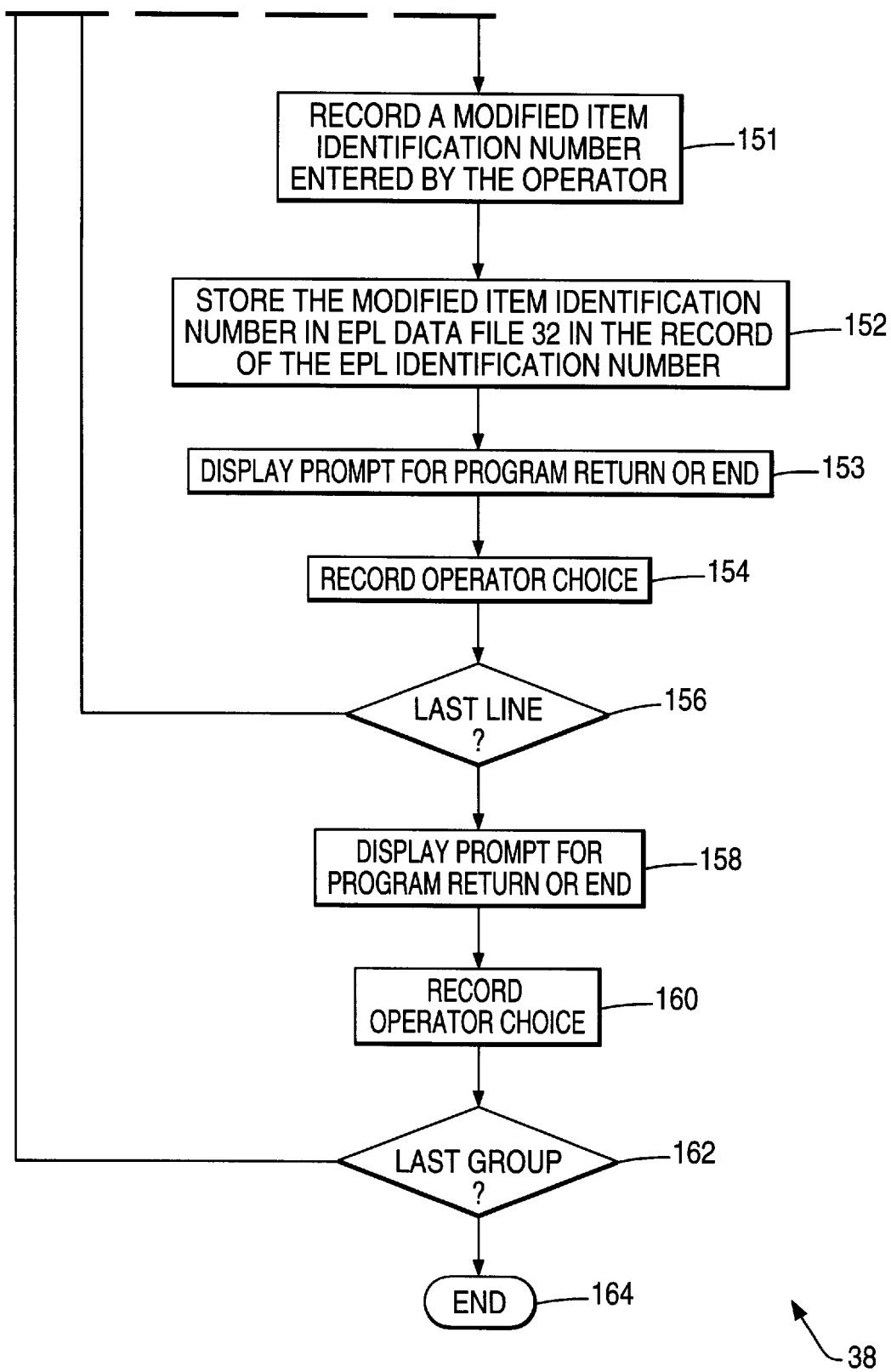

With reference to FIGS. 8A and 8B, operation of PLU assignment software 38 begins with START 130.

In step 132, PLU assignment software 38 displays a prompt for a group number using display 48.

In step 134, PLU assignment software 38 records a group number entered by an operator using input device 47.

In step 136, PLU assignment software 38 determines the number of lines in the selected group from group definition file 46.

In step 138, PLU assignment software 38 displays the determined number of lines in the selected group.

In step 140, PLU assignment software 38 displays a prompt for a line number (LINE#) within the selected group.

In step 142, PLU assignment software 38 records a line number entered by the operator.

In step 144, PLU assignment software 38 reads a corresponding EPL identification number (EPL ID) for the selected line number from EPL assignment file 52.

In step 146, PLU assignment software 38 displays a prompt for an item identification number (ITEM ID) to be assigned to the selected line number.

In step 148, PLU assignment software 38 records an item identification number entered by the operator.

In step 149, PLU assignment software 38 displays a list of modified item identification numbers and their prices. The modified item identification numbers include the item identification number and special bits to identify prices within PLU data file 44 for the same item.

In step 150, PLU assignment software 38 displays a prompt for a modified item identification number to be assigned to the selected relative EPL number.

In step 151, PLU assignment software 38 records a modified item identification number entered by the operator.

In step 152, PLU assignment software 38 stores the modified item identification number for the relative EPL number in EPL data file 32 in the record of the EPL identification number.

In step 153, PLU assignment software 38 displays a prompt for program return to assign another item to another line, or for operation to continue.

In step 154, PLU assignment software 38 records the operator choice entered using input device 47.

In step 156, PLU assignment software 38 determines from the recorded choice whether to return or continue.

For return, operation returns to step 138 to assign another item identification number to another line in the selected group.

Otherwise, operation continues in step 158.

In step 158, PLU assignment software 38 displays a prompt for program return to select another group, or for program end.

In step 160, PLU assignment software 38 records the operator choice entered using input device 47.

In step 162, PLU assignment software 38 determines from the recorded choice whether to return to select another group, or to end.

For return, operation returns to step 132 to select another group.

Otherwise, operation ends at END 164.

Advantageously, PLU assignment software 38 assigns merchandise items to relative EPL numbers by automatically determining the EPL identification numbers. The operator does not need to know any EPL identification numbers in order to assign items to relative EPL numbers within groups.

Turning now to FIG. 9, sign 200 includes EPL cassette 202, product description sheet holder 203, and product description sheet 204.

Cassette 202 is a ladder-shaped device having a plurality of bays 206 arranged in a single line. Here, a single column of five rows or bays 206 are shown. However, the present invention envisions other numbers of bays 206 greater than one as well. Not all bays 206 need be filled with EPLs 22A. The number of EPLs 22A is determined by the product and the product description sheet 204. Here, only the top and bottom EPLs 22A are installed within sign 200. Cassette 202 is preferably made of plastic.

In more detail, each bay 206 includes left wall 208, right wall 210, top wall 212, bottom wall 214, and back wall 216. Walls 208–214 are planar and form a frame for openings having substantially similar dimensions as the perimeters of EPLs 22A.

EPLs 22A include feet 218 and locking tabs 220 for retaining EPLs 22A within bays 206. EPLs 22A are inserted within bays 206 by inserting the bottom edge and feet 218 first, and the inserting the top edge and locking tabs 220 last. Removal is accomplished in reverse after using a key to depress locking tabs 220.

Bottom walls 214 include bottom support members 222 upon which EPL 22A sit. Bottom support members 222 include end portions 224 which retain feet 218 in place within bays 206.

Back walls 216 include a include feet viewing apertures 226 and tab viewing apertures 228. Feet viewing apertures 226 allow an operator to access feet 218 and end portions 224. Tab viewing apertures 228 are located near the upper edges of back walls 216 and allow an operator to access locking tabs 220.

Each bay 206 is deep enough so that the front surfaces 234 of EPLs 22A are substantially flush with front surface 236 of cassette 202.

Cassette 202 may additionally include base 232 for supporting cassette 202 on a table or other flat surface. Here, base 232 is attached to cassette 202, however, base 232 may also be integrally manufactured with cassette 202. The disclosed cassette 202 with base 232 allows product description sheet 204 to be inclined, but other cassette orientations, including substantially vertical orientations, are also envisioned. Cassette 202 may also be manufactured without base 232 so that cassette 202 may be mounted on walls and other substantially vertical surfaces.

Cassette 202 additionally includes top and bottom retaining members 238 and 240 which retain product description sheet holder 203 against front surface 236 of cassette 202 and front surfaces 234 of EPLs 22A. Product description sheet holder 203 is inserted into cassette 202 by first placing bottom edge 242 behind bottom retaining member 240 and then pressing top edge 244 under top retaining member 238. Once in place, product description sheet holder 203 is held snugly in place by bottom retaining member 240 and top retaining member 238, but can be easily removed by applying a removal force to top edge 244 and top retaining member 238. Thus, reconfiguration with a different product description sheet 204 is easily accomplished.

Product description sheet holder 203 retains product description sheet 204. For this purpose, product description sheet holder 203 is generally U-shaped, having first and second panels 250 and 252. Panels 250 and 252 join at top edge 244. Product description sheet holder 203 is preferably made of transparent plexiglas or plastic.

Product description sheet 204 slides between panels 250 and 252 of product description sheet holder 203. Product description sheet 204 includes item identification information, such as product name, brand, and style, and may additionally include other promotional information. Product description sheet 204 includes apertures 212 and 214 which line up with displays 260 of EPLs 22A when sign 200 is assembled with installed EPLs 22A.

FIG. 9 illustrates a product description sheet 204 which includes promotional information for different styles or types of a single product. Each style has a corresponding EPL 22A for displaying the price of the style.

FIG. 10 illustrates a product description sheet 204 which includes promotional information for a special or "sale" promotion in which one of EPLs 22A displays a regular price and the other EPL 22A displays a sale price.

Although the present invention has been described with particular reference to certain preferred embodiments thereof, variations and modifications of the present invention can be effected within the spirit and scope of the following claims.

What is claimed is:

1. An electronic price label (EPL) system comprising:
    a plurality of EPLs arranged in a single line within a sign to define a group;
    a computer coupled to the EPLs which defines the group, which assigns the EPLs to the group, and which assigns item identification numbers and prices to the EPLs; and
    storage means coupled to the computer for storing group definition information, EPL assignments to the group, and item assignments to the EPLs.

2. The EPL system as recited in claim 1, wherein the item identification numbers are associated with different styles of a single product.

3. The EPL system as recited in claim 1, wherein the item identification numbers are associated with different prices of a single product.

4. The EPL system as recited in claim 1, wherein the storage means additionally stores prices associated with the EPLs.

5. A method of displaying prices of related items comprising the steps of:
    (a) providing a plurality of electronic price labels (EPLs) for the items;
    (b) defining a group for the EPLs, including a single line;
    (c) assigning EPL identification numbers for the EPLs in the line; and
    (d) assigning item identification numbers associated with the items to the EPL identification numbers.

6. The method as recited in claim 5, wherein step d comprises the substeps of:
    (d-1) assigning a first item identification number to a first EPL identification number in a first row, wherein the first item identification number is associated with a first price; and
    (d-2) assigning a second item identification number to a second EPL identification number in a second row, wherein the second item identification number is associated with a second price.

7. The method as recited in claim 5, wherein step d further comprises the substeps of:

(d-1) assigning a first item identification number associated with a first style of an item to a first EPL identification number in a first row, wherein the first item identification number is associated with a first price; and (d-2) assigning a second item identification number associated with a second style of the item to a second EPL identification number in a second row, wherein the second item identification number is associated with a second price.

8. The method as recited in claim 5, wherein step d comprises the substeps of:

(d-1) assigning a first item identification number associated with an item to a first EPL identification number in a first row, wherein the first item identification number is associated with a regular price of the item; and (d-2) assigning a second item identification number associated with the item to a second EPL identification number in a second row, wherein the second item identification number is associated with a special price.

9. A method of displaying prices of items comprising the steps of:

(a) providing a plurality of electronic price labels (EPLs);

(b) defining a group for the EPLs, including a single line of EPLs;

(c) assigning EPL identification numbers for the EPLs to rows within the single line;

(d) assigning prices to item identification numbers associated with the items; and (e) assigning the item identification numbers to the EPL identification numbers.

10. The method as recited in claim 9, wherein step d comprises the substep of:

(d-1) storing price identifiers associated with prices in records containing the EPL identification numbers and the item identification numbers.

11. The method as recited in claim 9, wherein step d comprises the substep of:

(d-1) storing price identifiers associated with prices in the item identification numbers.

12. The EPL system as recited in claim 1, wherein the item identification numbers are associated with different styles of a plurality of related products.

13. The EPL system as recited in claim 1, wherein the sign includes a cassette having a plurality of bays arranged in a single line.

14. The EPL system as recited in claim 13, wherein the sign includes a base for supporting the cassette on a surface.

15. The EPL system as recited in claim 13, wherein the sign is adapted for displaying a product description sheet which includes item identification information.

16. The method as recited in claim 9 further comprising the step of:

(f) storing group definition information in a group definition file.

17. The method as recited in claim 16 further comprising the step of:

(g) displaying prices associated with the items by the plurality of EPLs.

* * * * *